(No Model.) 5 Sheets—Sheet 1.
S. HUGHES.
HEATING AND VENTILATING RAILWAY CARRIAGES.
No. 534,831. Patented Feb. 26, 1895.
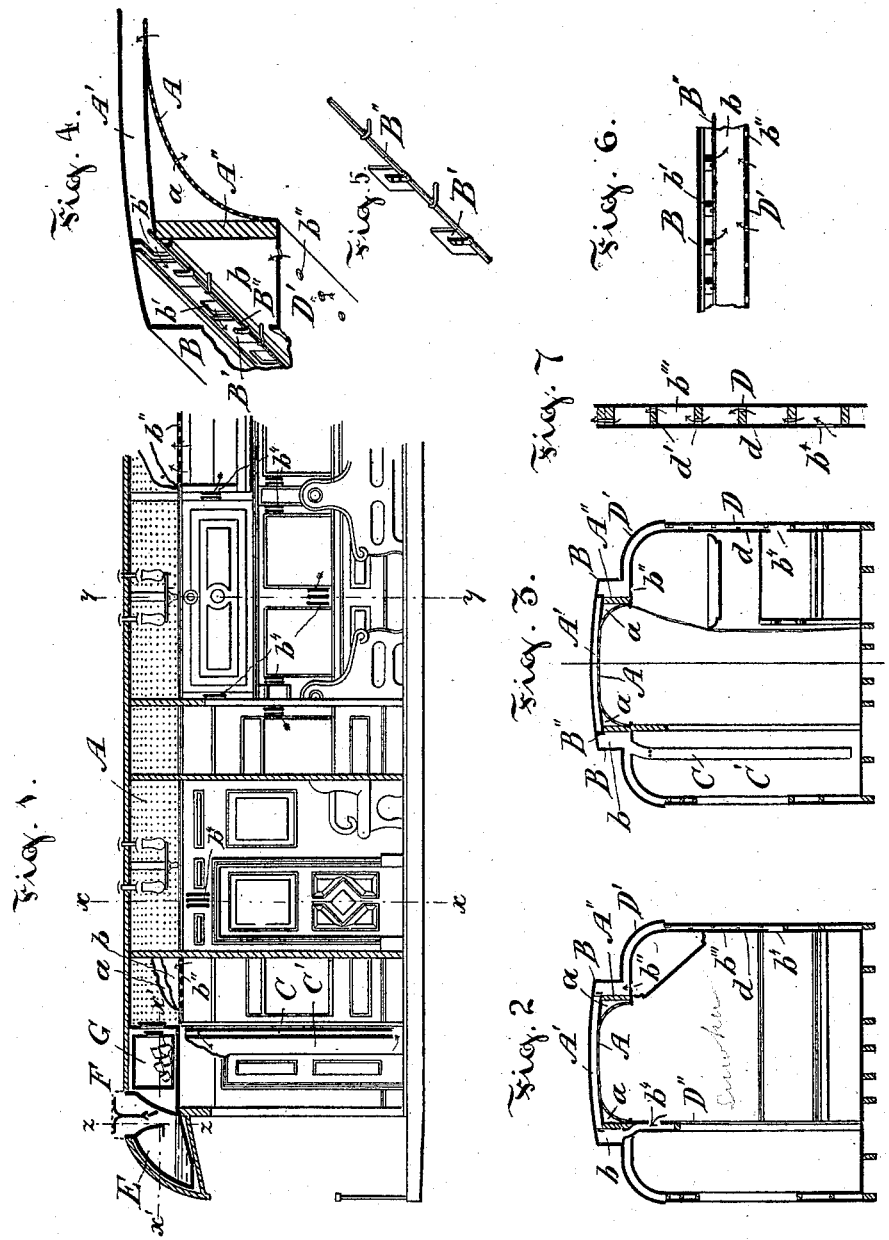
Witnesses:
Chas. Raley.
W. H. Noffke.
Samuel Hughes.
Inventor.
By A. Harvey
Attorney.
THE NORRIS PETERS CO., PHOTO-LITHO., WASHINGTON, D. C.

(No Model.) 5 Sheets—Sheet 2.
S. HUGHES.
HEATING AND VENTILATING RAILWAY CARRIAGES.
No. 534,831. Patented Feb. 26, 1895.

Witnesses
Chas. Raley.
W. E. H. Noffke.

Samuel Hughes.
Inventor.
By A. Harvey
Attorney.

(No Model.) 5 Sheets—Sheet 3.

S. HUGHES.
HEATING AND VENTILATING RAILWAY CARRIAGES.

No. 534,831. Patented Feb. 26, 1895.

Witnesses:
Chas. Raley.
W. E. H. Noffke.

Samuel Hughes.
Inventor.
by A. Harvey
Attorney.

(No Model.)  5 Sheets—Sheet 4.
S. HUGHES.
HEATING AND VENTILATING RAILWAY CARRIAGES.
No. 534,831. Patented Feb. 26, 1895.

Witnesses.
Chas. Raley.
W. H. Noffke.

Samuel Hughes.
Inventor.
By A. Harvey
Attorney.

(No Model.) 5 Sheets—Sheet 5.
S. HUGHES.
HEATING AND VENTILATING RAILWAY CARRIAGES.
No. 534,831. Patented Feb. 26, 1895.
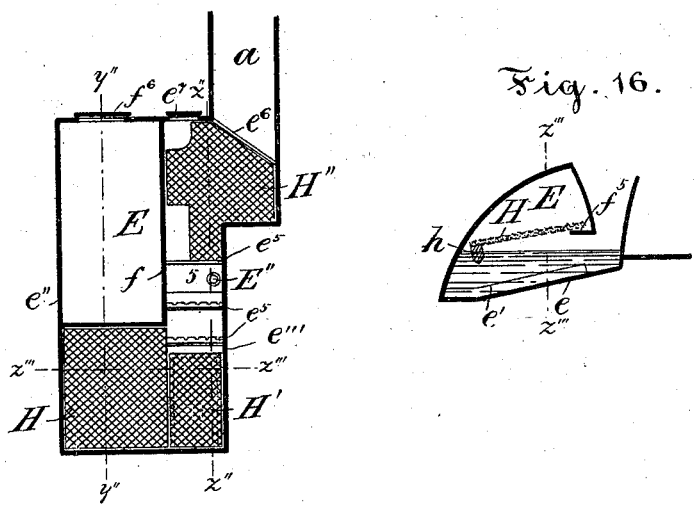
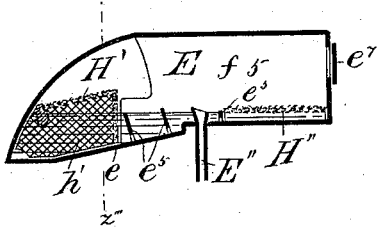
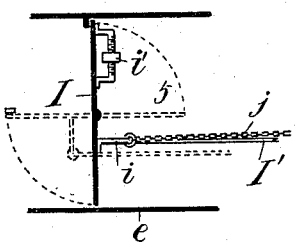

UNITED STATES PATENT OFFICE.

SAMUEL HUGHES, OF LINDSAY, CANADA.

HEATING AND VENTILATING RAILWAY-CARRIAGES.

SPECIFICATION forming part of Letters Patent No. 534,831, dated February 26, 1895.

Application filed May 21, 1894. Serial No. 511,908. (No model.)

*To all whom it may concern:*

Be it known that I, SAMUEL HUGHES, of Lindsay, in the county of Victoria and Province of Ontario, in the Dominion of Canada, have invented certain new and useful Improvements in Heating and Ventilating Railway-Carriages; and I do hereby declare that the following is a full, clear, and exact description of the same, reference being had to the accompanying drawings, forming a part hereof.

My invention, which will be hereinafter fully set forth and claimed, relates to the heating and ventilating of railway carriages.

The object of my invention is to further perfect and complete the system of heating and ventilating railway carriages and to adapt the same to sleepers, smokers and parlor, postal and other passenger cars.

Figure 8:
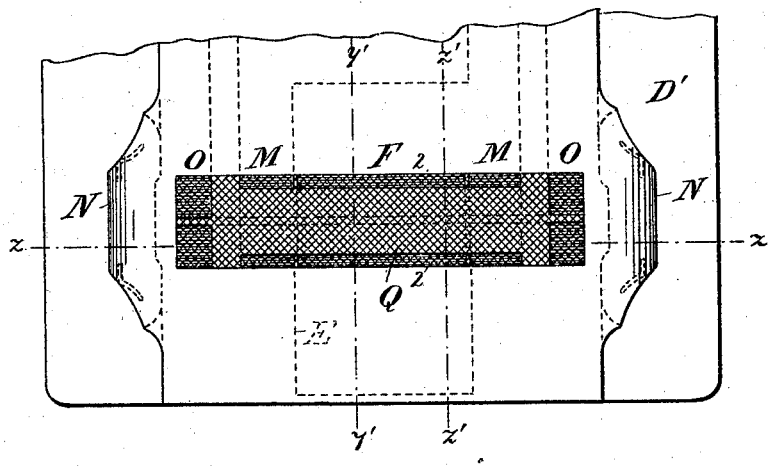
Figure 9:
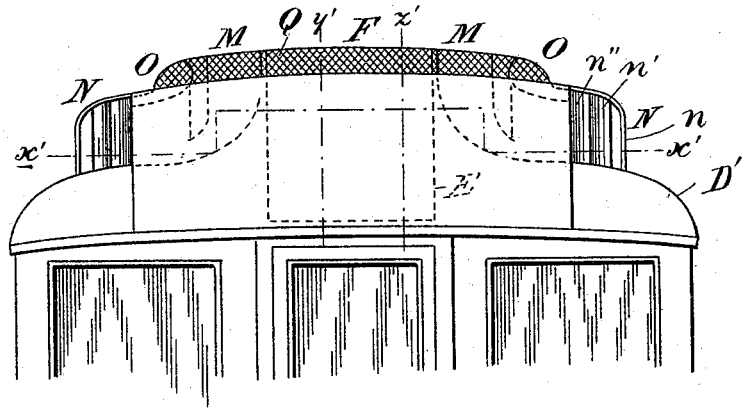
Figure 10:
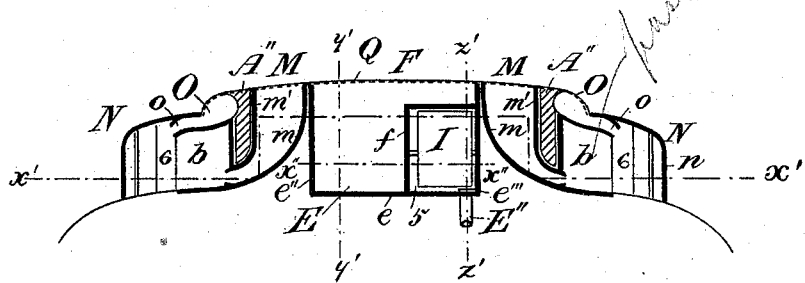
Figure 11:
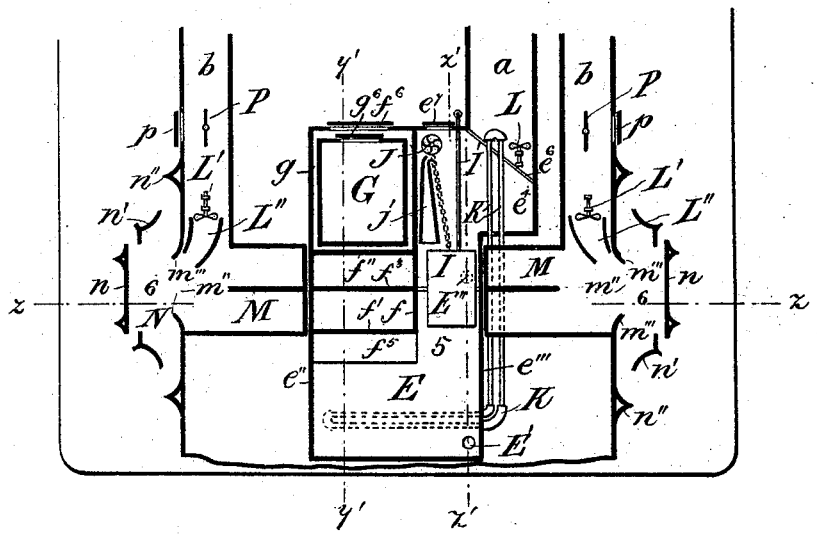
Figure 12:
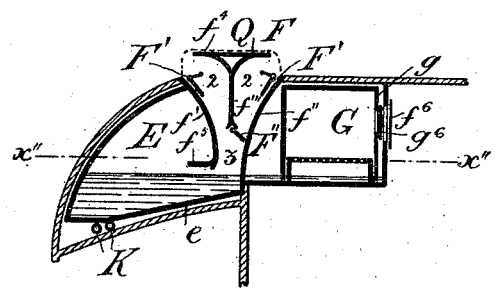
Figure 13:
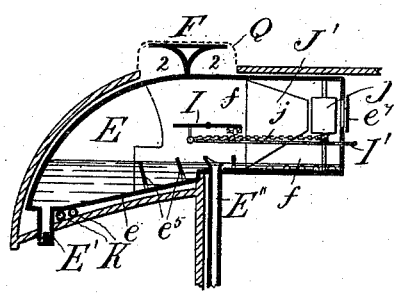

Figure 1 is a partial longitudinal section of a sleeper with smoking compartment and closet. Fig. 2 is a transverse section on line $x$ $x$, Fig. 1, being through the smoking compartment. Fig. 3 is a transverse section, one half being a section through the closet compartment and the other half through the main body of the car on line $y$ $y$. Fig. 4 is a detail showing in perspective a manner of extracting vitiated air and especially the heated air from the lamps. Fig. 5 is another detail showing the manner of operating the sliding doors for the same. Fig. 6 is a longitudinal vertical section through the main exhaust duct, showing the ventilation of the upper berth in the sleeper and the openings and doors shown in the two preceding figures in elevation. Fig. 7 is a vertical transverse section of the car side or wall, showing the construction and the manner of forming exhaust passages to connect with the main exhaust. Fig. 8 is a top view of the car end top on a larger scale, showing the injector, ejectors and deflectors. Fig. 9 is an end elevation of the same. Fig. 10 is a transverse vertical section of the same on line $z$ $z$ Figs. 1, 8 and 11. Fig. 11 is a horizontal transverse section of the same on line $x'$ $x'$ Figs. 1, 9 and 10. Fig. 12 is a vertical longitudinal section of the same on line $y'$ $y'$ Figs. 8, 9, 10 and 11, corresponding to Fig. 1, on a larger scale and being through the tank and cooling chamber. Fig. 13 is a vertical longitudinal section of the same on line $z'$ $z'$ Figs. 8, 9, 10 and 11, being parallel to Fig. 12 and showing tank and automatic damper. Fig. 14 is a detail of the automatic damper, being an enlarged portion of Fig. 13 and showing it closed. Fig. 15 is a horizontal section on line $x''$ $x''$. Figs. 10 and 12, parallel to Fig. 11 and showing the tank with a portion of the fresh air duct only and the strainers or mats. Fig. 16 is a longitudinal section of the same on line $y''$ $y''$ Fig. 15 specially, and Figs. 10 and 11 generally, corresponding to Fig. 12 and being parallel to Fig. 13, showing part of the tank only with air inlet. Fig. 17 is a longitudinal section of the same on line $z''$ $z''$ Fig. 15 specially and Figs. 10 and 11 generally, corresponding to Fig. 13, the valve or damper being omitted and showing strainers. Fig. 18 is a transverse section on line $z'''$ $z'''$ Figs. 15, 16 and 17, the valve or damper being omitted.

A curved or arched ceiling, A, Figs. 1, 2, 3 and 4, is formed in the monitor roof of the car, perforated sheet material, such as perforated zinc, veneer or the like, being made to extend from the base of the monitor side A'' at one side to the base of the other side, the central portion being secured to the carlings, A', and a spandrel, $a$, being formed in each angle to serve as a fresh air duct and distributer; the latter being, of course, made tight against the monitor side, A'', and the under side of the carling A'.

An exhaust or foul air duct, $b$, Figs. 2, 3 and 11, is formed outside along each side A'' of the monitor roof by a casing, B, forming an extension of the outer roof covering and extending parallel down the side A''. With these ducts the spaces between the carlings communicate by means of openings, $b'$, Figs. 4 and 6, between the ends of the carlings, made adjustable by means of doors or slides, B', secured to a sliding rod, B'', Figs. 4 and 5. The under side or bottom of said ducts, forming part of the ceiling of the upper berths in a sleeper and side roof D' of the car, is provided with perforations, $b''$, Figs. 1, 2, 3, 4 and 6, by which the vitiated or foul air is drawn into said ducts. With these ducts are also connected the ventilating pipes, C, in the closet compartment C', Figs. 1 and 3 and some of which may also be located in other parts of the car, as the corners in the main body. Said ducts are also connected with the upper ends of numerous passages, $b'''$, Figs 2, 3 and 7, formed within the sides or walls, D, of the car and extended through the curved portion of the side roof, D', adjoining the sides of the monitor, and having, at different heights, openings or slits, $b^4$, in the interior skin or finish, $d$, of the car, some or all of which may be made adjustable with slides which however are never made to close the openings entirely. The mode of constructing said passage $b'''$ in some cases is shown in Fig. 7, the cross pieces if used being alternately cut away at front and back; examples of the slits or openings $b^4$ being also shown in Fig. 1, which illustrates also the ventilating duct for the smoking compartment in the partition, D'', separating it from the corridor.

Thus far are described the various ducts and passages for conveying fresh and vitiated air and their construction and connections, and it now remains to describe the means for operating them.

Each fresh air duct $a$ is closed at one end and at the other it is connected with a casing forming and containing means for injecting, purifying, tempering and regulating a current of fresh air, consisting of injectors or blowers, water tank, strainers, cooling chamber, heating apparatus and regulating device, one of said casings being located at each end of the car roof. Each exhaust duct is provided at each end of the car roof with an ejector or exhaust and a regulator. Auxiliary blowers, in the shape of fans, may also be provided in each duct, near each injector and ejector, as shown in Fig. 11.

The water tank, E, Figs. 1, 10, 11, 12, 13, 15, 16, 17 and 18, consists of a casing occupying a central position transversely across the roof and within the hood overhanging the platform, extending into the car as far only as may be necessary to obtain the desired capacity. It is constructed with a sloping bottom, $e$, provided with longitudinal ridges $e'$ and having at its lowest part a draining plug E' and at a higher part an overflow E'' with pipe, with straight sides $e''$ $e'''$, to one of which the fresh air duct $a$ is joined at the rear portion, forming an elbow $e^4$, Figs. 11 and 15, a square end facing the interior of the car and provided with doors and with a curved combined end and top fitting the hood in which it is placed, as shown in Figs. 12, 13, 16 and 17. It is provided with a blower or injector, F, Figs. 10, 11, 12, and 13, extending transversely across it at the top, but only occupying a portion of its width in the lower part, one end being formed by a partition, $f$, which extends rearwardly, as shown in Figs. 11, 13, 15, 17 and 18.

The injector or blower consists of two curved plates, $f'$ $f''$, Figs. 11 and 12, their convex faces turned and inclined toward each other, being trumpet shaped in cross section, with a wide mouth at the top, and a confined nozzle below. A partition, $f'''$, midway between the two plates, extends only partly down the throat but projects above the mouth or lips and is covered with a strip or hood, $f^4$, of about the same width as the mouth, so that its edges are about vertical over the edges of the plates $f'$ $f''$ and thus form two mouths 2, 2, with a common throat 3 just above the nozzle; the mouths facing in opposite directions and the angles formed by the partition $f'''$ and the hood or cover $f^4$ being well rounded to form smooth curves and smooth passages. A flap valve, F', is pivoted at each lower lip of the mouths 2, so that it may be closed if desired, and a flap valve F'' is also pivotally hinged at the lower edge of the partition $f'''$, which, by being swung to one side or the other, may close any one of the two sides of the throat. The plate $f'$, being nearest the end of the roof, is carried down to within a short distance above the water level in the tank and provided with a deflecting plate, lip or shelf, $f^5$, projecting into the tank toward the end of the roof. The other plate, $f''$, is extended down to the bottom of the tank and, with the partition $f$, forms the cooling chamber, $g$, at the rear of the injector, having a door, $f^6$, in the rear end, accessible from the interior of the car, to give access to a corresponding door, $g^6$, in the ice box, G. The partition $f$ is perforated near the bottom to allow the tank water to circulate in the cooling chamber.

A mat or screen, H, Figs. 15, 16, 17 and 18, covered with loose material, such as moss, horse hair or made of wire, is supported by the shelf $f^5$ at one end and by a float, $h$, in the water, at the other, and acts as a strainer. This only extends along the lip $f^5$, and the remaining space by its side is occupied by a similar one, H', of the same description but with downwardly extending sides, $h'$, upon which it rests. The opposite end of this space, being the rear end of the passage, 5, formed by the partition $f$, and being the entrance to the fresh air duct $a$, is also covered with a mat, H'', of similar material. The intervening space, containing the overflow E'', is provided with transverse ridges or ribs, $e^5$, perforated at the bottom, to prevent the water from rushing violently toward one end but allowing it to circulate freely, also a ridge, $e^6$, to prevent the water entering the fresh air duct, and a door, $e^7$, is formed in the inner end of the tank to give access to that part of it. In this passage 5, through which the incoming air must pass on its way to the fresh air duct, is located the automatic valve or damper I, shown in Figs. 11, 13 and 14. It is pivoted in the center, provided at its lower part with a projection, $i$, to which a rod, I', is pivoted which passes through the end of the tank, for working it by hand. The upper part is provided with an adjustable balance weight, $i'$, by the adjustment of which it may be made to require more or less pressure to close it or keep it closed. The automatic adjustment consists of a wind wheel, J, having upon its spindle a pulley adapted to wind up a chain or cord, $j$, the other end of which is secured to the projection $i$. Said wheel is placed opposite the end of a tubular conical duct, J', the wide mouth of which is placed opposite an open space left between the edge of the valve plate I and the partition $f$ and the contracted end faces the wheel. If the current of air in the passage 5 becomes too strong, the wind wheel I will revolve, wind up the chain or cord $j$ and close the valve I. As the latter does not entirely close up the passage, but still leaves an open space on one side, the current passing through that space will still act upon the wheel I and keep the chain or cord $j$ tight and the valve closed.

Pipes K, Figs. 11, 12 and 13, heated by hot water, steam or other medium, are laid along the side and under the tank (or they may be passing through it, the upper part of the air passage 5) to warm the incoming air and keep the water from freezing in cold weather. In cold weather, ice or other cooling medium is, of course, not required in the cooling chamber $g$, and in warm weather the service of the heating pipes is dispensed with.

An auxiliary fan, L, operated by electricity, or in any other convenient manner, is placed in the entrance of the duct $a$ to be used when the car is not moving or if the current is deficient from some other cause.

Ejectors or blowers, M, similar in all respects to the injectors or blowers F and forming a continuation of the latter at each side of the tank E between it and the monitor sides A'', but with the sides or ends, $m\ m'$, curved sidewise to form a passage through the lower part of said monitor sides, are formed and connected at a right angle with the ends of the exhaust ducts $b$, as shown in Figs. 8, 9, 10 and 11. A discharge opening, $m''$, having outwardly curved lips, $m'''$, is formed in the side of each exhaust duct, opposite each ejector and surrounded with a deflector, N, consisting of curved plates $n, n'$, and $n''$, Figs. 8, 9, 10 and 11, adapted to deflect a current parallel with the car and prevent it from sweeping through the space, 6, surrounded by them and past the lips $m'''$, but allowing the exhaust from the said discharge opening to pass out by the openings between the deflectors to the leeward of the external current. Small additional ejectors or blowers, O, Figs. 8, 9 and 10, are formed on the outside of the monitor sides A'', their throats, $o$, passing over the discharge openings $m''$ and discharging downwardly into the space 6. In these, the partitions $f'''$, though as high as in the others are without the hood $f^4$. All the mouths of the blowers, injectors and ejectors, are in a line and covered with gauze or heavy netting, Q, as shown in Figs. 8, 9, 12 and 13. The exhaust ducts, $b$, are also provided, near their ends, with dampers or valves, P, a door, $p$, in the side to give access thereto and with an auxiliary blower or exhaust fan L', to be used if desired, and operated by electricity or in any other desired manner. A nozzle, L'', curved toward the discharge opening $m''$, is provided for said fan, as shown in Fig. 11.

When the car is in motion, air is forced through each injector F by that one of the mouths 2 which is forward or windward for the time being. It passes into the tank E over the surface of the water and through the wet strainer H, turns and passes through the strainer H' and further turns into the passage 5, along the same over the mat H'' and into the duct $a$ whence it percolates through the perforations in the sheeting A into the body of the car. In its passage through the tank E, the air is cleaned and warmed or cooled if necessary. The ejectors M and O, operating in the same way as the injectors, form a partial vacuum in the ends of the ducts $b$, thus drawing the vitiated air from the various parts of the car into said ducts and discharging it through the discharge openings $m''$ into the space 6 whence it freely escapes through the openings between the deflectors $n, n'$ and $n''$.

I claim as my invention—

1. In a system of ventilating railway carriages, the combination with the non-perforate sides and carlings of the monitor roof, of an interior covering forming an arched and perforated ceiling extending from the lower part of the monitor side on one side to the lower part of the side on the other side and forming spandrels in the upper angles of the sides and carlings forming, with a non-perforate sheeting on the under side of the carlings within said spandrels, continuous longitudinal ducts having the side toward the interior of the car perforate, and allowing the air in the body of the carriage to pass through the central part of perforated ceiling into the space formed between the carlings substantially as set forth.

2. In a system of ventilating railway carriages, the combination of the non-perforate sides of the monitor roof and the adjoining portion of the side roof forming side and bottom of a duct of an outer casing consisting of an extension of the monitor roof covering and a downward extension forming a side parallel to the monitor side to form an exhaust duct, substantially as set forth.

3. In a system of ventilating railway carriages, the combination with the non-perforate side of the monitor roof, of the adjoining part of the side roof provided with perforations to form the bottom of a duct, and an extension of the monitor roof covering its top and a downward extension of the same to form the other side thereof, limited openings between the ends of the carlings communicating with the space between said carlings, of doors B' adapted to close said openings and a rod B'' held slidingly and having said doors secured thereto, substantially as set forth.

4. In a system of ventilating railway carriages, the combination with the carlings and non-perforate sides of the monitor roof and the adjoining parts of the side roof, of an arched inner surface formed of perforated material secured to the lower part of the sides and the central parts of the carlings forming spandrels in the angles which are sheeted on the carlings to form ducts, ducts on the outside of the non-perforate monitor sides formed by an extension of the outer covering of the monitor roof and downwardly extending sides, and adjustable openings between the ends of the carlings within the last mentioned ducts, substantially as set forth.

5. In a system of ventilating railway carriages, the combination with a longitudinal duct formed externally on the non-perforate side of the monitor roof and the adjoining side-roof, of passages extending down the side roof and car wall or side between the inner and outer sheeting of the same and communicating with said duct at one end and with the interior of the car by slits or openings in the inner sheeting or skin, substantially as set forth.

6. In a system of ventilating railway carriages, the combination with the longitudinal duct formed externally on the non-perforate side of the monitor roof and the adjoining side-roof, of passages extending down through the inner partitions and communicating with said duct at one end and with the interior of the car by slits or openings in the sheeting or skin of said partition and of ventilating pipes C communicating with said duct, substantially as set forth.

7. In a system of ventilating railway carriages, the combination with the distributing fresh air duct $a$ and the end of the car roof, of a water tank E within the hood overhanging the platform and extending into the car roof and having a sloping bottom provided with a draining plug and overflow, an injector or blower F having a double mouth extending above the roof surface, a cooling chamber $g$ within said tank, a passage 5 at the side of said cooling chamber and connecting with said duct laterally, heating coils K adapted to heat said tank and passage, a damper I in said passage, a wind wheel J operating said damper and a tubular duct J′ directing a current to said wheel, substantially as set forth.

8. The combination with a confined passage 5, of a valve or damper I pivoted therein horizontally and adapted to close said passage except a vertical portion on one side, an adjustable balance weight at the upper part, a projection at the lower part, a rod linked to said projection, a chain or cord coupled to said projection, a wind wheel J on a vertical spindle having a pulley adapted to coil up said chain or cord and a tubular conical duct J′ extending from the chink at the side of the damper to the wind wheel, substantially as set forth.

9. In a purifying and cooling tank, the combination of a sloping bottom $e$ with longitudinal ribs $e'$, sides $e''$ and $e'''$, a curved end and top fitting the hood of the car roof end and a square end facing the interior of the car with doors $g^6$ and $e^7$, a partition $f$ separating one portion into a topped passage 5 and a cooling chamber $g$, curved plates $f'$ $f''$ forming an injector or blower with wide mouth at the top of the tank one springing from the bottom and forming one end of the cooling chamber, a deflecting lip $f^5$ at the lower edge of the other plate, a partition $f'''$ between the upper portion of said plates and extending above the mouth, a hood $f^4$ covering said partition at a right angle and forming two mouths 2 2 with a common throat 3, the transverse ribs $e^5$ on the bottom in the passage 5 perforated near said bottom and a rib or ridge $e^6$ separating said passage bottom from that of the joint fresh air duct, substantially as set forth.

10. In an air purifying and tempering tank, the combination of a sloping bottom $e$, sides $e''$ and $e'''$, square end with doors and curved combined end and top fitting the hood of the roof end, a partition $f$ separating a portion of the space into an inlet 2 and 3, cooling chamber $g$ and passage 5, an injector or blower consisting of the curved plates $f'$ $f''$ with partition $f'''$ and hood $f^4$ forming the inlet 2 and 3 and a partition between the straining space and cooling chamber, a deflecting lip and ledge $f^5$ at the lower edge of the inlet nozzle, a strainer H supported at one end on said ledge and by a float $h$ at the other, a strainer H′ having sides $h'$, and a mat strainer H″ in the exit end of the passage 5, longitudinal ribs $e'$ on the sloping bottom, transverse ribs $e^5$ with perforations in the passage 5 and a ridge $e^6$ at the end of said passage, substantially as set forth.

11. The combination with a water tank, of two curved plates $f'$ $f''$ having their convex faces turned toward each other and forming a narrow nozzle below with a wide mouth at the top, a partition $f'''$ midway between said plates extending partly down the throat and above the mouth, and a hood $f^4$ at the upper edge of said partition, substantially as set forth.

12. The combination of a double mouthed injector or blower F having its mouths just above the surface of the car roof and its nozzle in a water tank above the surface of the water, a cooling chamber at the rear of said throat, a water space in front and at the side thereof and a covered passage forming a continuation of said side space, a strainer in front of said injector and supported at one end on the lip of the nozzle and at the other by a float, a strainer with sides at the side of said floating strainer, a damper I in said passage, a distributing fresh air duct joined to said passage and having its bottom separated therefrom by a ridge, and an auxiliary fan in said duct near its junction with the passage, substantially as set forth.

13. In a system of ventilating railway carriages, the combination of exhaust ducts $b$ with ejectors or blowers M, discharge openings $m''$ in said ducts opposite said ejectors, deflectors N forming spaces 6 around said discharge openings, auxiliary ejectors O having their discharge nozzles in the upper part of said spaces 6, auxiliary fans L' in said ducts near said discharge openings, nozzles L'' for said fans, dampers P near said discharge openings and doors $p$ to give access thereto, substantially as set forth.

14. In a system of ventilating railway carriages, the combination of an exhaust duct $b$ of which the monitor side forms one side, a discharge opening in the side near each end having lips $m'''$, an ejector M having its nozzle opposite said discharge opening and deflectors $n$ $n'$ and $n''$ forming a space surrounding said discharge opening for the escape of the discharge from said opening without interference from currents parallel to said duct, substantially as set forth.

15. The combination with the monitor roof of a railway carriage, of a central injector F, two ejectors M one at each end and two ejectors O one at each end of the latter all formed in line across said roof and near the end thereof and each consisting of curved plates having their convex faces turned toward each other their upper edges farther apart than the lower and flush with the roof surface and having a central partition projecting part of the way down the throat and above the upper edges and the injector and one adjoining ejector at each end thereof covered with a hood at a right angle to form mouths 2, the ends of the ejectors curved sidewise to form lateral nozzles, a tank into which the injector projects and two exhaust ducts having discharge openings with which said ejectors are connected opposite said discharge openings, substantially as set forth.

In testimony whereof I have signed my name in the presence of the undersigned witnesses.

SAM. HUGHES.

Witnesses:
A. HARVEY,
A. TROWSE.